United States Patent
Kumaran et al.

(10) Patent No.: US 8,380,435 B2
(45) Date of Patent: Feb. 19, 2013

(54) WINDOWED STATISTICAL ANALYSIS FOR ANOMALY DETECTION IN GEOPHYSICAL DATASETS

(75) Inventors: Krishnan Kumaran, Raritan, NJ (US); Jingbo Wang, New York, NY (US); Stefan Hussenoeder, Sugarland, TX (US); Dominique G. Gillard, Houston, TX (US); Guy F. Medema, Magnolia, TX (US); Fred W. Schroeder, Tomball, TX (US); Robert L. Brovey, League City, TX (US); Pavel Dimitrov, Houston, TX (US); Matthew S. Casey, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 383 days.

(21) Appl. No.: 12/775,226

(22) Filed: May 6, 2010

(65) Prior Publication Data

US 2011/0272161 A1 Nov. 10, 2011

(51) Int. Cl.
*G01V 3/00* (2006.01)
*G05B 19/42* (2006.01)
*G06G 7/36* (2006.01)
*E21B 49/00* (2006.01)

(52) U.S. Cl. .................. 702/2; 700/89; 703/10; 175/50; 166/250.1

(58) Field of Classification Search .................. 702/1, 2; 700/1, 89, 90; 703/3, 9, 10; 166/250.01, 166/250.1, 254.1; 175/50
See application file for complete search history.

(56) References Cited

U.S. PATENT DOCUMENTS

| | | | |
|---|---|---|---|
| 4,916,615 A | 4/1990 | Chittineni |
| 5,047,991 A | 9/1991 | Hsu |
| 5,274,714 A | 12/1993 | Hutcheson et al. |
| 5,465,308 A | 11/1995 | Hutcheson et al. |
| 5,848,379 A | 12/1998 | Bishop |
| 5,892,732 A | 4/1999 | Gersztenkorn |
| 5,940,777 A | 8/1999 | Keskes |

(Continued)

FOREIGN PATENT DOCUMENTS

| | | |
|---|---|---|
| WO | WO 99/64896 | 12/1999 |
| WO | WO 01/84462 | 11/2001 |

(Continued)

OTHER PUBLICATIONS

Tuzel, O. et al. (2006), "Region Covariance: A Fast Descriptor for Detection and Classification," Springer-Verlag, pp. 589-600.

(Continued)

*Primary Examiner* — Jennifer H Gay
(74) *Attorney, Agent, or Firm* — ExxonMobil Upstream Research Company Law Dept.

(57) ABSTRACT

Method for identifying geologic features from geophysical or attribute data using windowed principal component (22), or independent component, or diffusion mapping (61) analysis. Subtle features are made identifiable in partial or residual data volumes. The residual data volumes (24) are created by (36) eliminating data not captured by the most prominent principal components (14). The partial data volumes are created by (35) projecting the data (21) on to selected principal components (22, 61). Geologic features may also be identified from pattern analysis (77) or anomaly volumes (62, 79) generated with a variable-scale data similarity matrix (73). The method is suitable for identifying physical features indicative of hydrocarbon potential.

31 Claims, 7 Drawing Sheets
(3 of 7 Drawing Sheet(s) Filed in Color)

U.S. PATENT DOCUMENTS

| | | | |
|---|---|---|---|
| 5,995,448 | A | 11/1999 | Krehbiel |
| 6,226,596 | B1 | 5/2001 | Gao |
| 6,295,504 | B1 | 9/2001 | Ye et al. |
| 6,363,327 | B1 | 3/2002 | Wallet et al. |
| 6,430,507 | B1 * | 8/2002 | Jorgensen et al. ............ 702/6 |
| 6,466,923 | B1 | 10/2002 | Young |
| 6,574,566 | B2 | 6/2003 | Grismore et al. |
| 6,725,163 | B1 | 4/2004 | Trappe et al. |
| 6,766,252 | B2 | 7/2004 | Blanch et al. |
| 6,950,786 | B1 | 9/2005 | Sonneland et al. |
| 7,162,463 | B1 | 1/2007 | Wentland et al. |
| 7,184,991 | B1 | 2/2007 | Wentland et al. |
| 7,188,092 | B2 | 3/2007 | Wentland et al. |
| 7,248,258 | B2 | 7/2007 | Acosta et al. |
| 7,295,706 | B2 | 11/2007 | Wentland et al. |
| 7,308,139 | B2 | 12/2007 | Wentland et al. |
| 2002/0028021 | A1 | 3/2002 | Foote et al. |
| 2002/0169735 | A1 | 11/2002 | Kil et al. |
| 2002/0183932 | A1 * | 12/2002 | West et al. ............ 702/14 |
| 2003/0112704 | A1 | 6/2003 | Goff |
| 2003/0200030 | A1 | 10/2003 | Meldahl et al. |
| 2004/0225442 | A1 * | 11/2004 | Tobias et al. ............ 702/9 |
| 2005/0171700 | A1 | 8/2005 | Dean |
| 2005/0288863 | A1 | 12/2005 | Workman |
| 2006/0184488 | A1 | 8/2006 | Wentland |
| 2006/0269139 | A1 | 11/2006 | Keskes |
| 2008/0049551 | A1 * | 2/2008 | Muyzert et al. ............ 367/24 |
| 2008/0082302 | A1 * | 4/2008 | Samardzija et al. ............ 703/2 |
| 2011/0272161 | A1 * | 11/2011 | Kumaran et al. ............ 166/369 |
| 2011/0297369 | A1 * | 12/2011 | Kumaran et al. ........ 166/250.01 |

FOREIGN PATENT DOCUMENTS

| | | | |
|---|---|---|---|
| WO | WO 2010056424 | A1 * | 5/2010 |

OTHER PUBLICATIONS

Cho, W.H. et al. (1992), "Estimation of Polarization and Slowness in Mixed Wavefields," *Geophysics* v. 57, pp. 805-814.

Coifman, R.R. et al. (2005), "Geometric diffusions as a tool for harmonic analysis and structure definition of data: Diffusion maps," *Proceedings of the National Academy of Sciences*, 102(21), pp. 7426-7431.

Crow, F.C. (1984) in "Summed-Area Tables for Texture Mapping," *Computer Graphics* v. 18, pp. 207.

Fournier, F. et al. (1995), "A Statistical Methodology for Deriving Reservoir Properties from Seismic Data," *Geophysics* v. 60, pp. 1437-1450.

Hagen, D.C. (1982), "The Application of Principal Components Analysis to Seismic Data Sets," *Geoexploration* v. 20, pp. 93-111.

Hotelling, H.,(1933), "Analysis of a Complex of Statistical Variables Into Principal Components," *Journal of Education Psychology* v. 24, pp. 417-441.

Key, S.C. et al. (1990), "New Approach to Seismic Reflection Event Detection and Velocity Determination," *Geophysics* v. 55, pp. 1057-1069.

Pearson K. (1901), "On Lines and Planes of Closest Fit to Systems of Points in Space," *Philos. Magazine* v. 2, pp. 559-572.

Richwalski, S. et al. (2000), "Practical Aspects of Wavefield Separation of Two-Component Surface Seismic Data Based on Polarization and Slowness Estimates," *Geophysical Prospecting* v. 48, pp. 697-722.

Sheevel, J.R. et al. (1999), "Principal Component Analysis Applied to 3D Seismic Data for Reservoir Property Estimation," *Society of Petroleum Engineers Annual Conference and Exhibition*.

Singer, A., (2006), "Spectral independent component analysis", *Applied Computational Harmonic Analysis*, Anal. 21, pp. 135-144.

Wu, J. et al. (2005), "Establishing Spatial Pattern Correlations Between Water Saturation Time-Lapse and Seismic Amplitude Time-Lapse," *Petroleum Society's 6th Annual Canadian International Petroleum Conference (56th Annual Technical Meeting)*.

European Search Report, dated Dec. 23, 2009.

International Search Report, dated Nov. 18, 2009.

Watanabe, S. (1967), "Karhunen-Loeve Expansion and Factor Analysis," *Transactions of the Fourth Prague Conf.*, J. Kozesnik, ed., Prague, Czechoslovakia Academy of Science, pp. 635-660.

International Preliminary Report on Patentability, dated Jul. 20, 2011, PCT/US2009/059044.

\* cited by examiner

WINDOWED STATISTICAL ANALYSIS FOR ANOMALY DETECTION IN GEOPHYSICAL DATASETS

CROSS-REFERENCE TO RELATED APPLICATIONS

This application is a continuation-in-part of PCT International Application No. PCT/US09/059,044, which claims the benefit of U.S. Provisional application 61/114,806 which was filed on Nov. 14, 2008 and U.S. Provisional application 61/230,478 filed Jul. 31, 2009, the disclosures of which are hereby incorporated herein in their entirety by reference.

FIELD OF THE INVENTION

The invention relates principally and generally to the field of geophysical prospecting, and more particularly to a method for processing geophysical data. Specifically, the invention is a method for highlighting regions in one or more geological or geophysical datasets such as seismic, that represent real-world geologic features including potential hydrocarbon accumulations without the use of prior training data, and where the desired physical features may appear in the unprocessed data only in a subtle form, obscured by more prominent anomalies.

BACKGROUND OF THE INVENTION

Seismic datasets often contain complex patterns that are subtle and manifested in multiple seismic or attribute/derivative volumes and at multiple spatial scales. Over the last several decades, geologists and geophysicists have developed a range of techniques to extract many important patterns that indicate the presence of hydrocarbons. However, most of these methods involve searching for either known or loosely defined patterns with pre-specified characteristics in one data volume, or two volumes at the most. These "template-based" or "model-based" approaches often miss subtle or unexpected anomalies that do not conform to such specifications. These approaches will not be discussed further here as they have little in common with the present invention except that they address the same technical problem.

Most of these known methods involve a human interpreter searching for either known or loosely defined patterns with pre-specified characteristics in one data volume, or two volumes at the most. These "template-based" or "model-based" approaches often miss subtle or unexpected anomalies that do not conform to such specifications. It is therefore desirable to develop statistical analysis methods that are capable of automatically highlighting anomalous regions in one or more volumes of seismic data across multiple spatial scales without a priori knowledge of what they are and where they are. The present invention satisfies this need.

SUMMARY OF THE INVENTION

In one embodiment, the invention is a method for identifying geologic features in one or more discretized sets of geophysical data or data attribute (each such data set referred to as an "original data volume") representing a subsurface region, comprising: (a) selecting a data window shape and size; (b) for each original data volume, moving the window to a plurality of locations, and forming for each window location a data window vector whose components consist of voxel values from within that window; (c) performing a statistical analysis of the data window vectors, the statistical analysis being performed jointly in the case of a plurality of original data volumes; (d) using the statistical analysis to identify outliers or anomalies in the data; and (e) using the outliers or anomalies to predict geologic features of the subsurface region. In one embodiment of the invention, the statistical analysis technique is diffusion mapping, in which a basis is computed that represents the data. This basis is the result of a non-linear transformation, which affords a parameter that defines a notion of scale.

The geologic features that are identified using the present inventive method may then be used to predict the presence of hydrocarbon accumulations.

BRIEF DESCRIPTION OF THE DRAWINGS

The patent or application file contains at least one drawing executed in color. Copies of this patent or patent application publication with color drawings will be provided by the Office upon request and payment of the necessary fee.

The present invention and its advantages will be better understood by referring to the following detailed description and the attached drawings in which.

As a test example application of the present inventive method.

Figure 1A:
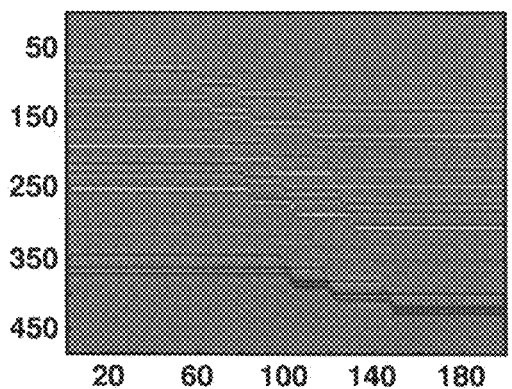
FIG. 1A shows an image (2D time slice) from a 3D volume of synthetic seismic data.

The invention will be described in connection with example embodiments. To the extent that the following description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

The present invention is a method for detecting anomalous patterns in multi-volume seismic or other geophysical data (for example, electromagnetic data) across multiple spatial scales without the use of prior training data. The inventive method is based on Windowed Statistical Analysis, which involves the following basic steps in one embodiment of the invention:

1. Extracting a statistical distribution of the data within windows of user-specified size and shape. Standard statistical techniques such as Principal Component Analysis (PCA), Independent Component Analysis (ICA), Clustering Analysis may be used.
2. Extracting anomalous regions in the data by (a) computing the probability of occurrence (or equivalent metric) of each data window in the extracted distribution (b) identifying low probability data regions as possible anomalies.

Extracting a statistical distribution is not a necessary step in the present invention. The anomalies or outliers may be identified from the statistical analysis, either directly or by other techniques besides a statistical distribution; for example, some embodiments of the invention use diffusion mapping. See FIGS. 6 and 7.

A particularly convenient embodiment of the invention involves a combination of Windowed Principal Component Analysis ("WPCA"), Residual Analysis, and Clustering Analysis which will be described in detail below. However, anyone of ordinary skill in the technical field will readily appreciate how other statistical analysis techniques may be used or suitably adapted to achieve the same goals.

A useful generalization of Principal Component Analysis ("PCA") is a method known as Independent Component Analysis ("ICA"), which is preferable when the data strongly differ from the standard multi-dimensional Gaussian distribution. In this case, the present inventive method is correspondingly generalized to use Windowed ICA ("WICA"), followed by a generalization of Residual Analysis, termed Outlier Detection. In one embodiment, the present invention uses PCA on moving windows, followed by computation of inner products and data residuals from the Principal Components ("PCs"), which is believed to be advantageously applicable not only in seismic applications, but across the broader field of multi-dimensional data processing. This includes the fields of image, speech, and signal processing.

Principal Component Analysis ("PCA") is a well-known classical technique for data analysis, first proposed by Pearson ("On Lines and Planes of Closest Fit to Systems of Points in Space," *Philos. Magazine* v. 2, pp. 559-572 (1901)) and further developed by Hotelling ("Analysis of a Complex of Statistical Variables Into Principal Components," *Journal of Education Psychology* v. 24, pp. 417-441 (1933)). What is believed to be the first known application of principal component analysis to seismic data occurred in the form of the Karhunen-Loeve transform, named after Kari Karhunen and Michel Loeve (Watanabe, "Karhunen-Loeve Expansion and Factor Analysis," *Transactions of the Fourth Prague Conference*, J. Kozesnik, ed., Prague, Czechoslovakia Academy of Science (1967)). This method uses PCA to describe the information content in a set of seismic traces, with the form of the input dataset being entire seismic traces, not multi-dimensional windows of variable size. Watanabe's primary application was to decompose entire seismic traces, and use the first several principal component traces to reconstruct the most coherent energy, thereby filtering out non-geologic noise.

PCA is most commonly used in seismic analysis to reduce the number of measurement characteristics to a statistically independent set of attributes (see, e.g., Fournier & Derain, "A Statistical Methodology for Deriving Reservoir Properties from Seismic Data," *Geophysics* v. 60, pp. 1437-1450 (1995); and Hagen, "The Application of Principal Components Analysis to Seismic Data Sets," *Geoexploration* v. 20, pp. 93-111 (1982)). The seismic interpretation process often generates numerous derivative products from the original data. Since these attributes correlate to varying degrees, PCA has been an elegant way to reduce the number of attributes, while retaining a large amount of information.

To date, there are believed to be no moving window-based statistical outlier detection techniques devoted to finding geologic features of interest on a scoping and reconnaissance basis in geological and geophysical data. However, such techniques have been applied to specific subsets or domains of seismic data for specialized signal processing or reservoir characterization applications. Key and Smithson ("New Approach to Seismic Reflection Event Detection and Velocity Determination," *Geophysics* v. 55, pp. 1057-1069 (1990)) apply PCA on 2D moving windows in pre-stack seismic data, and ratio the resultant eigenvalues as a measure of signal coherency. No use is made of the principal components themselves to detect features in the prestack seismic data. Sheevel and Payrazyan ("Principal Component Analysis Applied to 3D Seismic Data for Reservoir Property Estimation," *Society of Petroleum Engineers Annual Conference and Exhibition* (1999)) calculate trace-based principal components using small, 1D moving vertical windows, and input those PCs that look most geologic into a classification algorithm that predicts reservoir properties away from well calibration. Once again, this 1D, single dataset approach, makes no attempt to automatically identify anomalies or outliers in the data. Cho and Spencer ("Estimation of Polarization and Slowness in Mixed Wavefields," *Geophysics* v. 57, pp. 805-814 (1992)) and Richwalski et al. ("Practical Aspects of Wavefield Separation of Two-Component Surface Seismic Data Based on Polarization and Slowness Estimates," *Geophysical Prospecting* v. 48, pp. 697-722 (2000)) use 2D windowed PCA in the frequency domain to model the propagation of a pre-defined number P- & S-waves.

The goal of Wu et al. ("Establishing Spatial Pattern Correlations Between Water Saturation Time-Lapse and Seismic Amplitude Time-Lapse," *Petroleum Society's 6th Annual Canadian International Petroleum Conference* (56th *Annual Technical Meeting*) (2005)) is to optimally correlate single seismic or time-lapse seismic volumes to flow simulation data in a reservoir model to estimate actual saturation time-lapse values of spatial patterns. Their approach is to perform point-to-point comparisons, not on the original data volumes, but on the projection of these data onto the first principal eigenvector from PCA analysis. Thus, their objective is correlation of seismic data to a known model instead of identification of anomalous patterns in the seismic data.

U.S. Pat. No. 5,848,379 to Bishop ("Method for Characterizing Subsurface Petrophysical Properties Using Linear Shape Attributes," (1998)) discloses a method to predict subsurface rock properties and classify seismic data for facies or texture analysis, not to identify geologic features of interest on a scoping and reconnaissance basis which is the technical problem addressed by the present invention. Bishop performs statistical analysis using PCA to decompose seismic traces into a linear combination of orthogonal waveform bases called Linear Shapes within a pre-specified time or depth interval. A Linear Shape Attribute (LSA) is defined as the subset of weights (or eigenvalues) used to reconstruct a particular trace shape. Also, Bishop does not disclose overlapping windows, simultaneously analyzing multiple data volumes, or use of a statistical distribution to detect anomalous data regions.

Other approaches for statistically analyzing geological and geophysical data have used methods such as Artificial Neural Networks, Genetic Algorithms, and multipoint statistics, but not with the goal of automatic detection of anomalous patterns. In addition, these methods have generally had limited success, since their inner workings are often obscure, and they often require, and are highly dependent on, large amounts of training data.

As stated previously, PCA and ICA are methods that are commonly used to separate high-dimensional (i.e., multi-variable or -attribute) signals into statistically uncorrelated (i.e., independent) components. The present invention's windowed PCA and ICA apply component analysis to a dataset that is derived from the original data by representing each point (in some embodiments of the invention) in the original data as a collection of points in its neighborhood (i.e., window). To illustrate this concept with reference to the flow chart of FIG. 3, the implementation of WPCA on a single, 3-dimensional, data volume using a fixed window size is outlined next. The same procedure or its ICA equivalent could be applied to 2D data, or simultaneously to multiple 2D or 3D data volumes. (See step 31 of FIG. 3.) Consider a 3D seismic volume of size $N_x \times N_y \times N_z$:

(Step 32) Select a window shape (e.g., ellipsoid or cuboid) and size (e.g., radius r, $n_x \times n_y \times n_z$)

Each voxel in the 3D seismic volume, $I_{i,j,k}$, is represented as an $n_x \times n_y \times n_z$ dimensional vector $\vec{I}_{i,j,k}$, that contains voxel values within each voxel's windowed neighborhood. Although used in the embodiment being described, exhaustive sampling is not required for the present invention. Other sampling strategies such as potentially random, or tiled, may be used instead.

(Step 33) Compute the mean and covariance matrix of all n-dimensional vectors ($n = n_x \times n_y \times n_z$) $\{\vec{I}_{i,j,k}\}$ ($N = (N_x - n_x) \times (N_y - n_y) \times (N_z - n_z)$ of them) as follows:

$$\vec{I} = \frac{1}{N}\sum_{i,j,k} \vec{I}_{i,j,k}, \quad W = \frac{1}{N}\sum_{i,j,k}\left(\vec{I}_{i,j,k} - \vec{I}\right)\left(\vec{I}_{i,j,k} - \vec{I}\right)^T$$

Compute the correlation matrix as $$\hat{W}(t,k) = \frac{W(t,k)}{\sqrt{W(t,t)}\sqrt{W(k,k)}}$$

where t and k are two indices of the vector I and thus represent two different sets of spatial coordinates in three dimensions.

(Step 34) Calculate the eigenvalues (Principal Values) $\{\lambda_1 > \lambda_2 > \ldots > \lambda_n\}$ and eigenvectors (Principal Components) $\{v_1, v_2, \ldots, v_n\}$ of $\hat{W}$. Alternatively, eigenvalues of the covariance matrix may be computed; they will differ from the eigenvalues of the correlation matrix only by a scaling factor. These eigenvectors will be $n_x \times n_y \times n_z$ in size, and when reshaped from their vector form back to window form, represent the various (independent) spatial patterns in the data, ordered from most common to least common. The corresponding eigenvalues represent how much of the original data (i.e., amount of variance) that each eigenvector accounts for.

Generate one or more of the following partial volumes of seismic or attribute data, which are then examined for anomalies that may not have been apparent from the original data volume:

(a) (Step 35) Projection: The portion of the original data that can be recreated using each Principal Component or groups of Principal Components (chosen, for example, from clustering analysis). This is achieved by taking the inner-product of the mean-centered and normalized seismic volume on each Principal Component or groups of Principal Components. Thus, the projection of vector A onto vector B means proj(A)=(A·B)B/|B|² and is a vector in the direction of B.

(b) (Step 36) Residual: The remaining signal in the original volume that is not captured by the first k−1 (i.e., most common) Principal Components. In a preferred embodiment of the invention, this is achieved by projecting the mean-centered and normalized seismic volume onto the sub-space spanned by $\{v_k, v_{k+1}, \ldots, v_n\}$ so that $$\sum_{i=1}^{k-1}\lambda_i > R \cdot \sum_{i=1}^{n}\lambda_i,$$

where R is a user-defined threshold between 0 and 1. Alternatively, one could add projections bottom-up, but this would be computationally more burdensome in most cases.

(c) Outlier: The residual analysis of item (b) is the way the "degree of anomaly" of each voxel is determined in one embodiment of the invention. The attribute data volumes of (a) and (b) are not needed in an alternative way of computing the "degree of anomaly" of each voxel, which will be denoted as R' (since it is related to, but not the same as, the residue R defined above), and is given by the following formula:

$$R_{i,j,k}' = (I_{i,j,k} - \vec{I})^T \hat{W}^{-1}(I_{i,j,k} - \vec{I}).$$

Using this measure of degree of anomaly, a partial data volume is developed. This measure also picks "outliers" that lie in the space spanned by the first few eigenvectors, but can be more computationally intensive than the above two steps in some cases. However, it may be noted that in this case step 34 above can be skipped, or simply replaced by a Cholesky decomposition of the correlation matrix, which enables faster evaluation of R'.

There are variants of the above basic approach that employ different data normalization schemes. The method can be extended to an arbitrary number of seismic volumes. The adjustable parameters that the user can experiment with are (1) window shape, (2) window size, and (3) threshold, R, of residual projection.

Figure 1B:
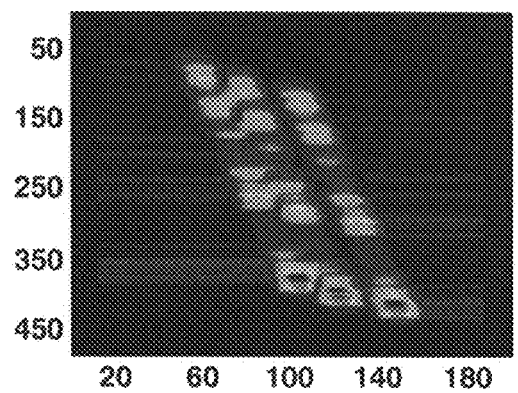
FIG. 1B shows the residual of the original image generated by the present inventive method, defined by the first sixteen principal components, which account for 90% of the information.
Figure 1C:
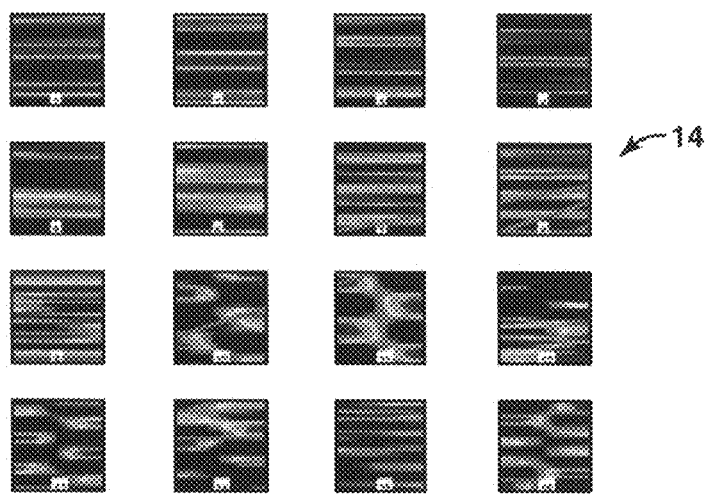
FIG. 1C illustrates the first sixteen principal components in 30×30 window form.

The result of applying a 3×3 WPCA on a 2-dimensional slice of seismic data is shown in FIGS. 1A-C. FIG. 1A shows an image (2D time slice) from a synthetic 3D seismic data volume. In actual practice, this display would typically be in color, where the colors indicate seismic reflection amplitudes (e.g., blue=positive, red=negative). FIG. 1B shows the residual of the original image after the first sixteen principal components have accounted for 90% of the information. The residue has high values at anomalous patterns, which in this case are faults. In a color version of FIG. 1B, blue might indicate a low amount of residual and warmer colors might highlight the anomalous faults system that can now clearly be seen in the residual display of FIG. 1B. In FIG. 1C, the top (i.e., first) sixteen principal components 14 are shown, in their 30×30 window form. The faults can be seen to be captured in several of the principal components in the bottom two rows.

Figure 2:
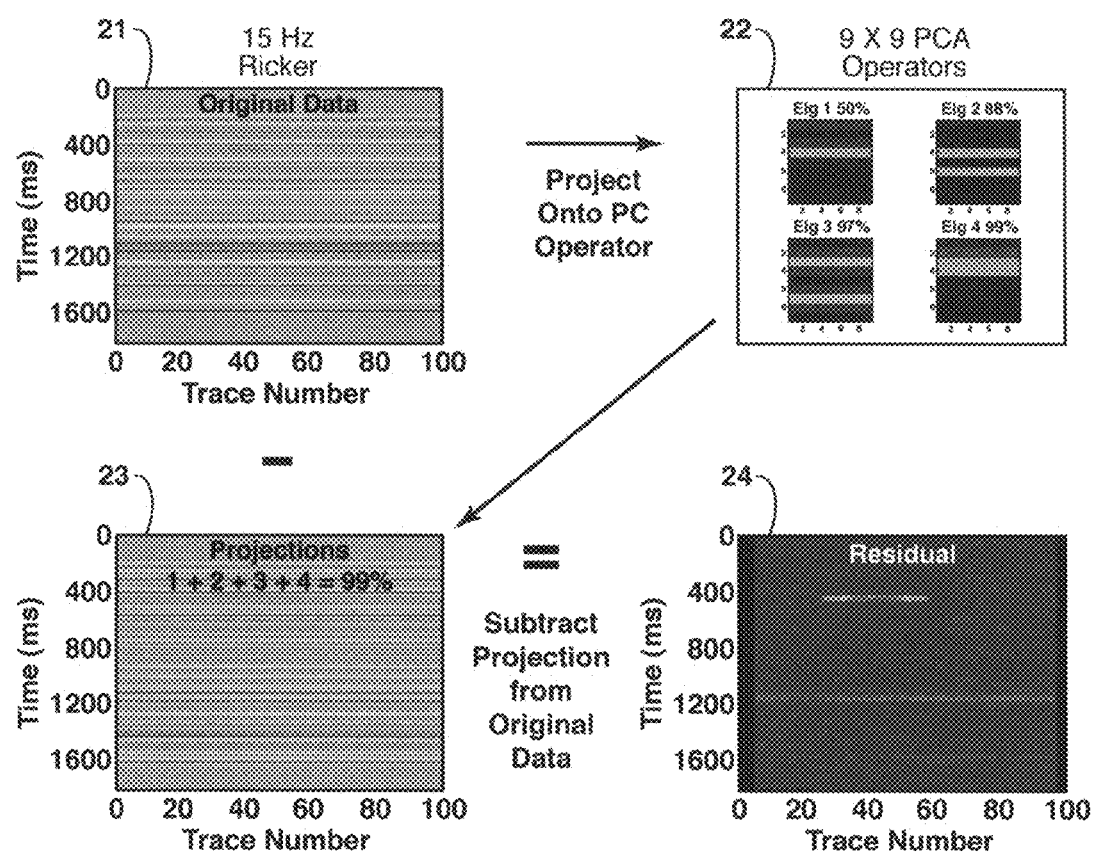
FIG. 2 is a schematic representation of basic steps in one embodiment of the present inventive method that uses residual analysis.

The result of applying a 9×9 WPCA on a 2-dimensional synthetic seismic cross-section is shown in the schematic flow chart of FIG. 2. At 21, a 2D cross-section from a synthetic 3D seismic data volume is displayed. Colors would typically be used to represent seismic reflection amplitudes. A small, 8-ms anticline, too subtle to detect by eye, is imbedded in the background horizontal reflectivity. The first four principal components (eigenvectors) of the input image are displayed at 22. Display 23 shows the projection of the original image on the first four eigenvectors, which account for 99% of the information. Display 24 shows the residual after the projected image is subtracted from the original. An imbedded subtle feature is now revealed at a depth (two-way travel time) of about 440 ms between trace numbers (measuring lateral position in one dimension) 30-50. In a color display, 'hot' colors might be used to reveal the location of the imbedded subtle feature.

Figure 3:
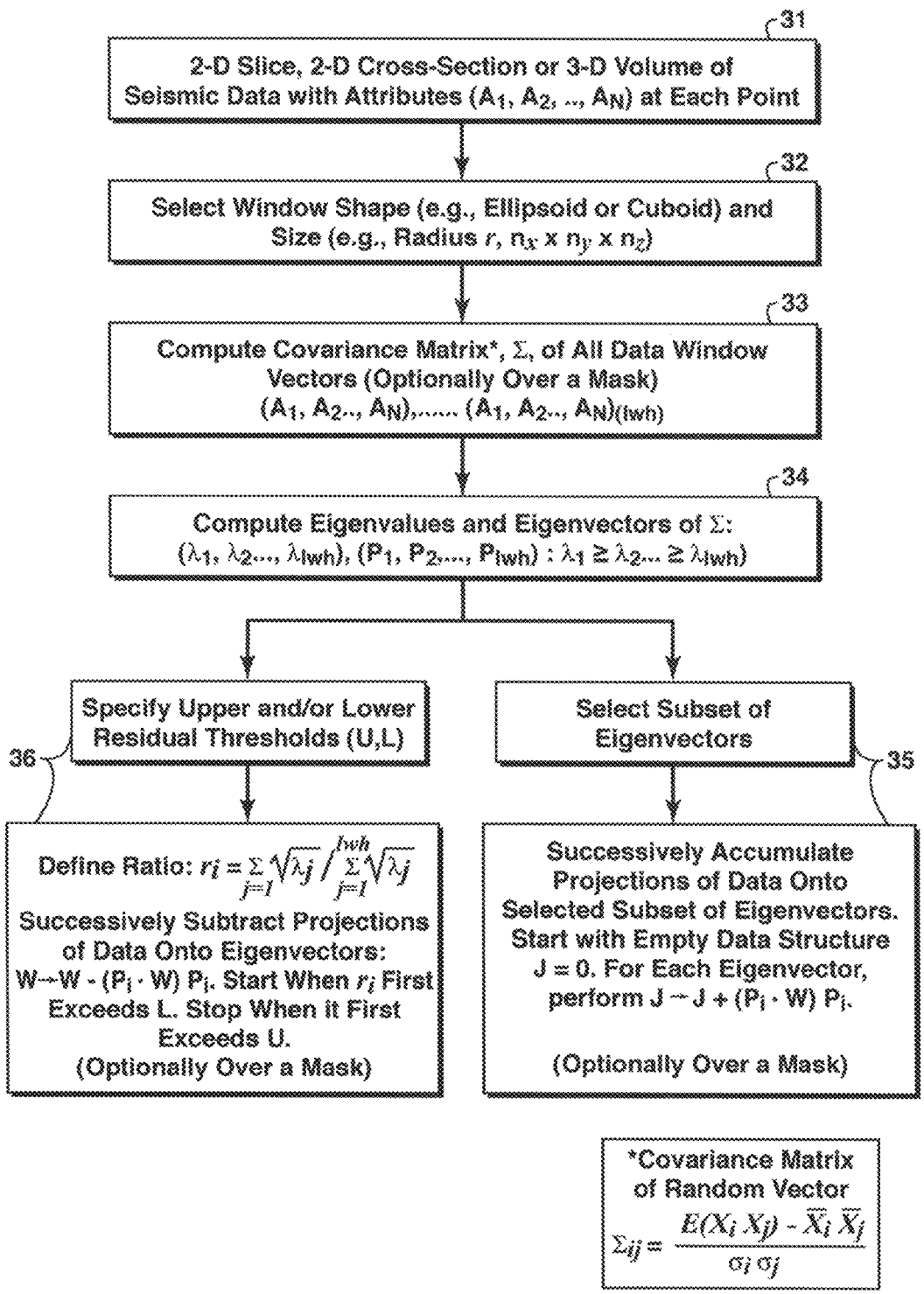
FIG. 3 is a flow chart showing basic steps in applying a windowed PCA embodiment of the present invention to multiple data volumes using a single window size.

The flowchart of FIG. 3 outlines an embodiment of the present inventive method in which WPCA is applied to multiple data volumes using a single window size.

Generalizations and Efficiencies in the Construction of Canonical Patterns

The following sections describe improvements to the windowed principal component analysis of the present invention that enable more convenient applicability through reduced computation, and better use of results through interpretation of Principal or Independent Components and their selective retention or removal Computational Efficiency: The straight-forward method of computing the covariance matrix above is computationally burdensome for large datasets, both in memory and processor requirements. An alternative method is therefore disclosed herein that exploits the fact that the individual vectors of the PCA are windows moving across the data. Consider, for example, a 1-D dataset with values $\{I_1, I_2, \ldots, I_N\}$. To evaluate the covariance matrix of windows of size $K \langle N$, the mean and second moment of the entries can be computed as follows:

$$E(X_i) = \overline{X}_i = \frac{1}{N-K} \sum_{k=i}^{N-K+i} I_k \text{ for } 1 \le i \le K$$

$$E(X_i X_j) = \frac{1}{N-K} \sum_{k=i}^{N-K+i} I_k I_{k+j-i} \text{ for } 1 \le i \le j \le K$$

It may be noted that this method only involves taking averages and inner products of sub-vectors of the data (sub-matrices in higher dimensions), and hence avoids storing and manipulating numerous smaller-sized windows derived from the original data. This modification of the computational method thus allows object-oriented software with efficient array indexing (such as Matlab and the use of Summed-Area Tables, a data structure described by Crow in "Summed-Area Tables for Texture Mapping," *Computer Graphics* 18, 207 (1984)) to compute the covariance matrices with minimal storage and computational effort.

Figure 4A:
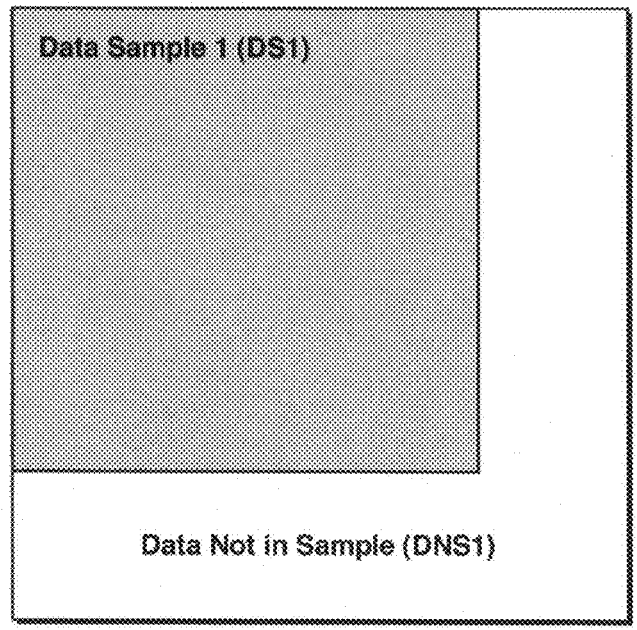
FIGS. 4A-B show a representation of a 2D slice of a data volume (large rectangle) and a sample of that data (smaller rectangle) for different pixels in a window, FIG. 4A showing the data sample for pixel (1,1) and FIG. 4B showing the data sample for the $i^{th}$ pixel.
Figure 4B:
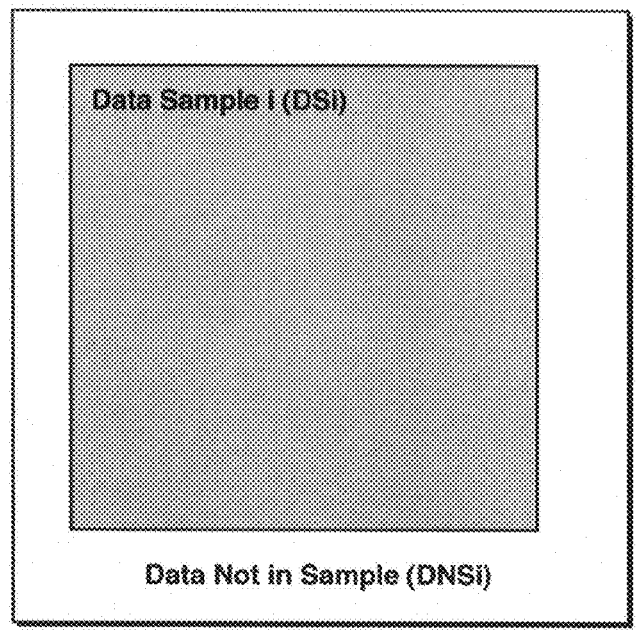

Alternatively, computational efficiency may be gained by representing the computation of the covariance matrix as a series of cross-correlation operations on progressively smaller regions. To illustrate the approach, consider a two dimensional data set as shown in FIGS. 4A-B of size $n=n_x*n_y$ and a two-dimensional window of size $m=m_x*m_y$. The correlation matrix W(t,k) can then be obtained by first computing the mean of each data sample, then computing an inner product matrix, and then normalizing that matrix and subtracting the means.

First, the means can be computed by convolving the data volume with a kernel of the size of the data sample (e.g., DS1) consisting of entries all equal to 1/(number of pixels in DS1). The result of this operation creates a large matrix but the means are the values located in a window of size m located at the upper left corner of that output. In general, this type of operation will be denoted corrW(kernel, data) and its result is a window of size m read as above. Performing the operation using a Fast Fourier Transform (FFT) takes time proportional to n*log(n) and is independent of the size of the sampling window. This FFT approach is faster than the explicit one when m is sufficiently larger than log(n).

Second, an inner product matrix U(t,k) is computed by performing a series of corrW operations on sub-samples of the data set. It may be noted that the row i of this matrix, denoted U(i,:), can be computed as U(i,:)=corrW(DSi,data). Hence, populating the matrix in this fashion takes time proportional to m*n log(n) or better. However, it is more advantageous to compute U(t,k) by performing several corrW operations on various sub-regions of the data. In particular, we may rewrite $$\text{corr}W(DSi,\text{data}) = \text{corr}W(\text{data},\text{data}) - \text{corr}W(\text{data},DNSi)$$

where corrR(data, DNSi) denotes the cross-correlation of the DNSi with the data in the vicinity of DNSi, that is within $m_x$ or $m_y$ of the location of DNSi. The operation corrW(data, data) needs to be performed only once for all rows and then corrW (data,DNSi) needs to be computed m times. The advantage comes from the fact that DNSi is typically much smaller than the size of the data set, so corrW(data,DNSi) is a cross-correlation over a much smaller input than corrW(data, data). Similarly, the computation of corrW(data,DNSi) can be broken down into several corrW operations on even smaller sub-regions.

Figure 5A:
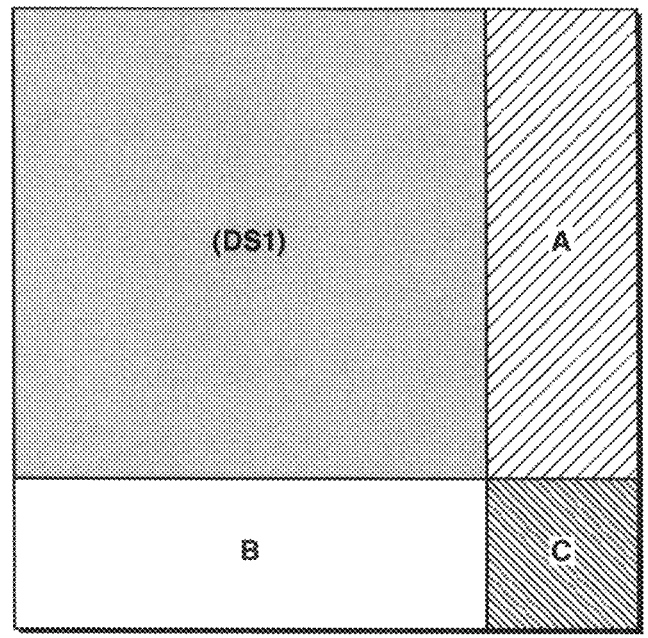
FIGS. 5A-B show subdivision of data not in the sample for the 2D data set of FIGS. 4A-B for efficient computation of the covariance matrix.
Figure 5B:
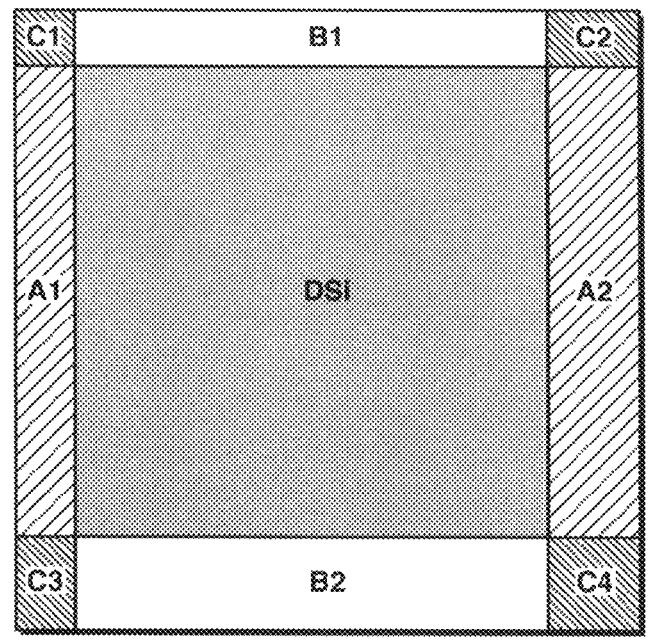

Large parts of the DNSi are the same for different samples and only differ along one dimension of the sampling window at a time. For example, consider the illustration in FIGS. 5A-B. The regions in FIG. 5A denoted by A, B and C taken together form the whole area of the data volume that is not sampled by pixel 1. That is the area that can be further subdivided to perform fewer calculations. Consider the "vertical" area spanned by A and C and compare to a different sampling region DSi as shown in FIG. 5B. The analogous vertical area is spanned by the union of several smaller regions: C1+C2+C3+C4+A1+A2. (The equivalent split for region B in FIG. 5A is the union B1+B2 in FIG. 5B.) In general, there are only $m_x$ distinct such possible areas each corresponding to a unique lateral location of DSi. In other words, the data contained in A+C will be the same for many different data samples DSi, so it needs to be manipulated only $m_x$ times–a savings of $m_y$ calculations on that area. Therefore, the calculation of corrW (data,DNSi) may be optimized in this fashion and computed according to $$\text{corr}W(\text{data},DNS1) = \text{corr}W(\text{data},A+C) + \text{corr}W(\text{data},B+C) - \text{corr}W(\text{data},C)$$

where the regions denoted by a letter mean the union of all regions labeled with that letter and a number; e.g., the C in the equation refers to region C in FIG. 5A and to C1+C2+C3+C4 in FIG. 5B, so A+C is represented by A1+A2+C1+C2+C3+C4 in FIG. 5B. Since the computation of corrW(data, A+C) needs to be performed only once for $m_y$ rows of U(t,k), and similarly for corrW(data,B+C), so the only part that needs to be computed for each row is corrW(data,C). The efficiency gains come from the fact that the region denoted by C is typically significantly smaller than the other regions. Proceeding in this fashion the algorithm extends to 3-D data sets and windows (and, indeed, to any dimension).

Finally, the cross-correlation matrix W(t, k) is obtained by appropriately normalizing the matrix U and subtracting the means.

$$W(t,k)=U(t,k)/nDS-\text{mean}(DSt)*\text{mean}(DSk)$$

where nDS is the number of elements in each data sample.

Use of Masks: For very large datasets, even the computational efficiencies described above may not be enough for available computational resources to yield results in a timely fashion. In such cases, one can apply either (a) inner product calculation with eigenvectors or (b) Principal Component calculation, on a pre-defined mask. A mask is a spatial subset of the data on which the calculations are performed. The mask may be generated either (a) interactively by the user, or (b) automatically using derivative attributes. An example of (b) would be pre-selection of data regions that have high local gradients using gradient estimation algorithms. The inner product computation is more burdensome than the calculation of Principal Components, which motivates the application of a mask to one or both calculations as needed.

Applications of Canonical Patterns

Furthermore, the computed Principal/Independent Components may be clustered into groups that represent similar patterns measured by texture, chaos or other characteristics. Along with the Residual volume, projection of the original seismic data onto individual, or groups of, Principal Component will generate a multitude of derived seismic volumes with anomalous patterns highlighted. These embodiments of the present inventive method are described in greater detail next.

Multiple Windows/Spatial Scales: Further, it is possible to streamline the effort in computing covariance matrices for multiple nested window sizes in hierarchical order, in comparison to the straight-forward way of computing them one at a time. Again, consider the one dimensional example with two window sizes $K_1<K_2$. The mean and second moments for $K_2$ are first computed using the method above, following which the same quantities for $K_1$ can be computed as follows:

$$E_{K_1}(X_i) = \frac{1}{N-K_1}\left[\begin{array}{l}E_{K_2}(X_i)*(N-K_2)+\\ \sum_{k=N-K_2+i}^{N-K_1+i} I_k\end{array}\right] \text{ for } 1\le i \le K_1$$

$$E_{K_1}(X_iX_j) = \frac{1}{N-K_1}\left[\begin{array}{l}E_{K_2}(X_iX_j)*(N-K_2)+\\ \sum_{k=N-K_2+i}^{N-K_1+i} I_k I_{k+j-i}\end{array}\right] \text{ for } 1\le i\le j \le K_1$$

Note that the above formulas permit computing the quantities for the smaller windows with incremental effort. It is straightforward to extend this method to a nested series of windows in higher dimensions.

Utilization of Principal Components and Projections: There are many possible ways in which the Principal Components and the projections generated by the present inventive method may be utilized, combined and visualized. One preferred implementation involves the identification of anomalies using the residual as described above. An equally valid approach is to perform selective projections of the original data on a chosen subset of PCs. The subset may be chosen either (a) interactively by the user, or (b) automatically using computational metrics on the PCs. An example of (b) could be the selection of PCs that have features resembling "channels" or tubular structures using an automatic geometric algorithm.

Another example might be to reduce noise in the input data by creating a projection that excludes "noisy" PCs, using a noise detection algorithm or dispersion metric. Persons who work in the technical field will recognize other examples from this description.

Alternative useful ways of visualizing the results of projections at various window sizes include visualization of (a) user or automatically selected combinations of PC projections, (b) residuals at various residual thresholds, or (c) noise components. Another useful variant includes visualization of a "classification volume", which involves color-coding each data location with a color that uniquely determines which PC projection has the highest value at that location.

Iterative WPCA: It has been found that the residual volume created by the workflow outlined in FIG. 3 exhibits larger values in areas that contain more anomalous patterns. As a consequence, subtler patterns in the input data are often masked by more obvious anomalies in the residual volume. To increase the sensitivity of WPCA to extremely subtle patterns, two alternative iterative approaches may be used:

Iterative Eigenvector Removal: This first alternative procedure may include the following steps:
1. Perform the first four steps of the FIG. 3 flowchart (through eigenvector and eigenvalue generation).
2. Identify those eigenvectors whose projections reconstruct a large amount of the background signal and the most obvious anomalies.
3. Project the data only onto the subset of eigenvectors that were not identified in the previous step (the background signal and that of the most obvious anomalies should be attenuated in this projected image).
4. Perform WPCA on the projected image generated in the previous step.
5. Repeat steps 1-3 as needed.

Iterative Masking or Data Removal: This second alternative procedure may include the following steps:
1. Perform the first four steps of FIG. 3 (through eigenvector and eigenvalue generation).
2. Through examining various residual volumes, identify those areas in the input data that correspond to the most obvious anomalies.
3. Perform WPCA on the data, excluding those identified areas by
   a. Setting all attribute values in those areas to zero prior to WPCA analysis, or
   b. Not including those areas as input to the WPCA.
4. Perform WPCA on the new dataset.
5. Repeat steps 1-3 as needed.

WPCA Classification: The Principal Components may be used to classify the image based on the strength of the projections. Such a classification will help identify regions with specific patterns represented in the chosen Principal Components through convenient visualization, especially when the original data consists of multiple volumes. This variation may include the following steps:
1. Perform steps 31-34 of FIG. 3 (through eigenvector and eigenvalue generation).
2. Assign each point in the data a number that corresponds to the eigenvector that reconstructs the most signal in the window around that point. This constitutes a classified volume in which each point contains a number between 1 (i.e., the first eigenvector) and $N=n_x \times n_y \times n_z$ (i.e., the last eigenvector).
3. The classification results are then visualized by assigning each value (or group of values) from 1-N a unique color or transparency (or combination thereof). This procedure is a form of pattern-based classification of N-dimensional images. By outputting categories, still based on the magnitude of signal in the projected images, rather than a continuous spectrum residual or projection values, this procedure suffers less from a lack of sensitivity to subtle features.

Thus, the present inventive method is advantageous for extracting features from large, high-dimensional datasets such as seismic data. Most published methods for applying PCA, for example, to seismic data are alike the present inventive method only in that they perform eigenmode decomposition on data windows. An example is the method of Wu et al. mentioned above. Their approach differs from the present invention in several fundamental ways. First, they apply only small, 1D vertically moving windows to the seismic data as input to PCA. 3D moving windows are used only on the flow simulation data. Second, only the first PC is used to reconstruct both the time-lapse seismic and flow simulation data. No other projections or mathematical combinations, such as the construction of a residual volume, are performed. Finally, no attempt is made to simultaneously examine multiple seismic volumes, let alone extract patterns intrinsic to the seismic data (i.e., not tied to a pre-existing geologic model).

Diffusion Mapping of Seismic Data

One approach to extract geologically meaningful patterns from seismic data consists of computing an appropriate representation of the data in some linear space. Typically this is the result of Principal Component Analysis (PCA) whereby the data is transformed into linear combinations of basis elements obtained by the method. Some patterns of geological interest violate several assumptions that PCA imposes: patterns of equal importance may appear at different scales, their distribution is not necessarily Gaussian, and the manifold which collects them in the data may not be linear. Outlined here is a method that addresses all of these concerns while preserving the benefits of PCA. The approach is based on the so-called Diffusion Map of R. R. Coifman et al.; see "Geometric diffusions as a tool for harmonic analysis and structure definition of data: Diffusion maps," *Proceedings of the National Academy of Sciences*, 102(21), 7426-7431 (2005), which is incorporated herein by reference in all jurisdictions that allow it. As with PCA, a basis is computed (61 in FIG. 6) that represents the data. Unlike PCA, this basis is the result of a non-linear transformation which affords a parameter (epsilon) that defines a notion of scale. Thus, non-linearities in the data are captured in a controlled fashion. Interestingly, the scale parameter may be tuned to produce similar results to those of PCA and the normalization which we employ here has been shown by A. Singer to be connected to Independent Component Analysis (ICA) ("Spectral independent component analysis", *Applied Computational Harmonic Analysis*, Anal. 21 (2006) 135-144).

Steps to Perform Diffusion Mapping of Seismic Data

Figure 7:
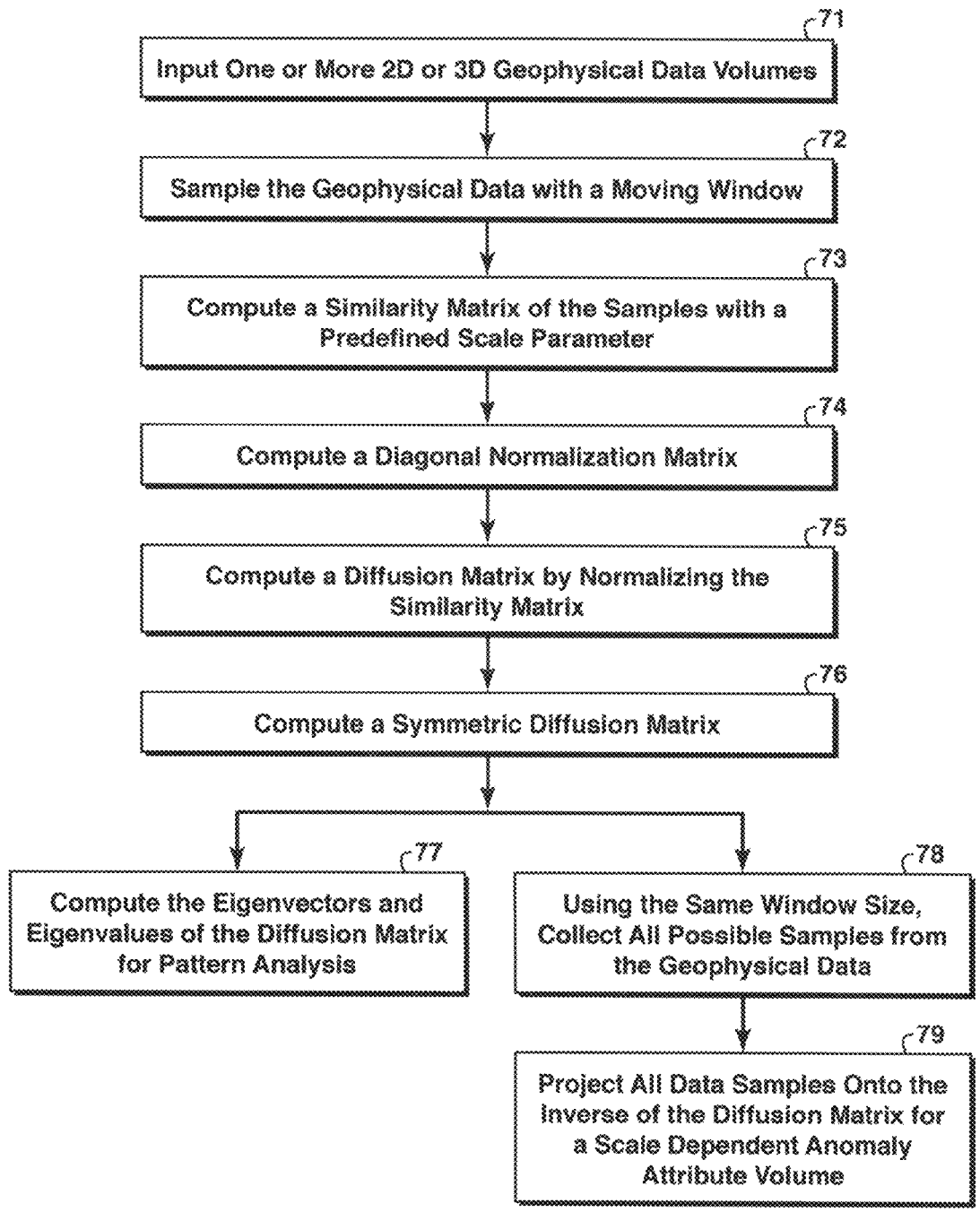
FIG. 7 is a flowchart showing basic steps in a diffusion mapping embodiment of the present invention.

In one embodiment, diffusion mapping may be performed with the basic steps being as follows, with reference to the flowchart of FIG. 7:

1. For a given 2D or 3D geophysical data volume(s) (71) and any given sampling strategy, for example potentially random, exhaustive, or tiled, sample the volume(s) with a sample design $\{s_x, s_y, s_z\}$: each sample consists of data points collected as given by an arbitrary, but fixed in size, 3-D window (e.g., a cube if $s_x=s_y=s_z$) that moves from one location to another in accordance with the sampling strategy (step 72).

2. Collect the random samples, i.e. data window vectors, $\{x_n\}_{n=1}^N$, into a data array $A_{m,n}$, where m=1, ..., M, M is the number of data voxels per sample (e.g., $M=s_x \times s_y \times s_z$ for a rectangular window), n=1, ..., N, and N is the number of samples such that M<<N.

3. At step 73, compute a symmetric similarity matrix $L_{i,j}=\exp(-\|a_i-a_j\|^2/\epsilon)$ such that a L=M×M matrix, and where $\|\ldots\|$ denotes a selected norm. Here $a_i$ and $a_j$ are row vectors of length N from the data array $A_{m,n}$ and M ∋ i,j. Epsilon ($\epsilon$) is a pre-defined scale factor.

4. At step 74, compute a diagonal normalization matrix $D=\text{Diag}(D_1, \ldots D_I)$ with $D_i=\Sigma_{j=1}^N L_{i,j}$.

5. At step 75, compute a diffusion matrix by normalizing the similarity matrix $M=D^{-1}L$.

6. At step 76, compute a symmetric diffusion matrix $M_{sym}=D^{1/2}MD^{-1/2}$.

Uses of Seismic Diffusion Mapping

This symmetric normalized similarity matrix can be used for data analysis in the following ways:

1. Pattern Analysis:
   a. At step 77 in FIG. 7, decompose $M_{sym}$ into its eigenvalues and eigenvectors by $\text{eig}(M_{sym})$, the eigenvectors with non-zero eigenvalues represent scale ($\epsilon$) dependant bases for pattern analysis. In some cases, subsets of the eigenvectors define a pattern of interest completely.

Figure 6:
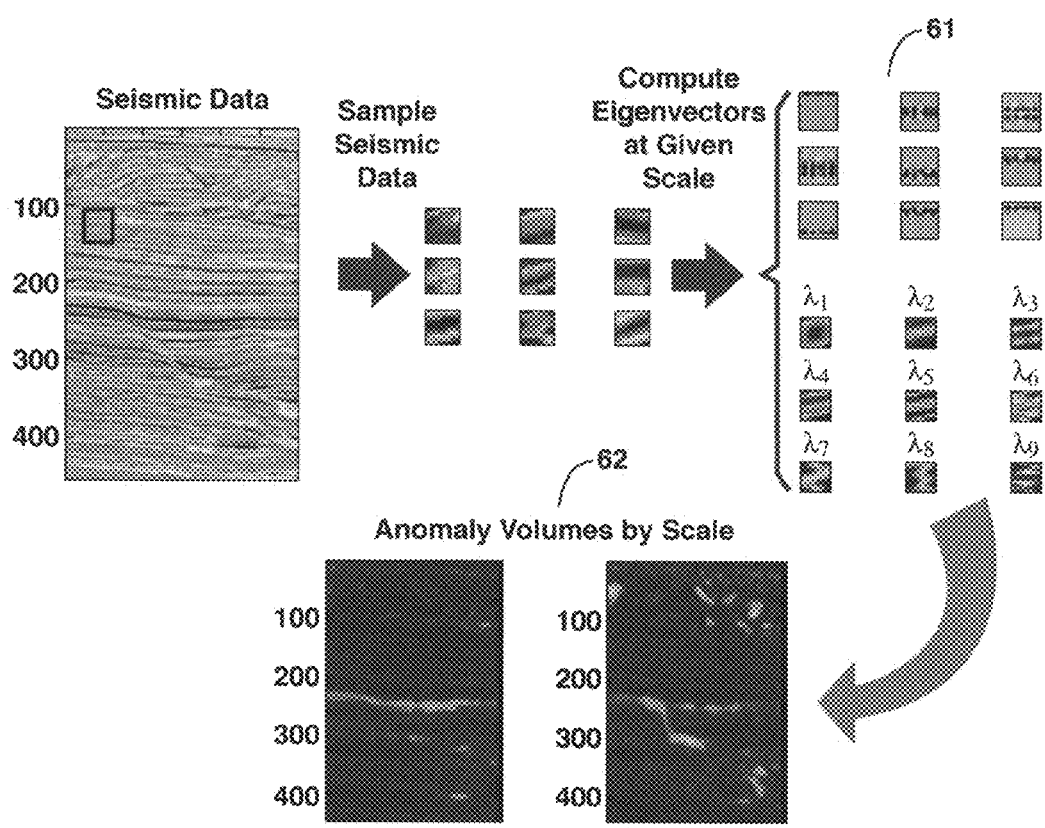
FIG. 6 is a schematic diagram showing a diffusion mapping embodiment of the present invention for two different values of the scale parameter.

2. Anomaly Detection (Anomaly Attribute)
   a. At step 78, using the same window as when $M_{sym}$ was computed, collect samples $\{x_n\}_{n=1}^N$ at all possible locations in the data volume.
   b. Create an anomaly volume initialized to zero everywhere.
   c. At step 79, for each analogous location n in the anomaly volume, set the value to $x_n^T M_{sym}^{-1} x_n$.
   d. Create at least one more anomaly volume using a different value of the scale parameter ($\epsilon$), and observe the scale dependent differences in the anomalies; FIG. 6 illustrates two anomaly volumes created at different scales (62).

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the field of technology will realize that for practical applications, at least some of the steps of the present inventive method must be performed using a computer, programmed in accordance with the teachings herein.

The invention claimed is:

1. A method for identifying geologic features in one or more discretized sets of geophysical data or data attribute representing a subsurface region, each such data set referred to as an "original data volume," the method comprising:
   (a) selecting a data window shape and size;
   (b) for each original data volume, moving the window to a plurality of locations, and forming for each window location a data window vector whose components consist of voxel values from within that window;
   (c) performing a statistical analysis of the data window vectors, the statistical analysis being performed jointly in the case of a plurality of original data volumes;
   (d) using the statistical analysis to identify outliers or anomalies in the data; and
   (e) using the outliers or anomalies to predict geologic features of the subsurface region.

2. The method of claim 1, wherein the statistical analysis is performed using one of a group of statistical analysis techniques consisting of:
   (i) computing the mean and the covariance matrix of all the data window vectors;
   (ii) Independent Component Analysis;

(iii) using a clustering method to cluster the data;
(iv) diffusion mapping; and
(v) another statistical analysis method.

3. The method of claim 2, wherein statistical analysis is performed using (i), further comprising using Principal Component Analysis.

4. The method of claim 3, wherein eigenvalues and eigenvectors of the covariance matrix are computed, said eigenvectors being a set of principal components of a corresponding original data volume;
and wherein steps (d) and (e) comprise projecting an original data volume on a selected subset of the eigenvectors to generate a partial projected data volume, said subset of eigenvectors being selected based on their corresponding eigenvalues, and determining a residual data volume, being the portion of the original data volume not captured in the projected data volume; then identifying anomalous features in the residual data volume, and using them to predict physical features of the subsurface region.

5. The method of claim 4, wherein the selected subset is selected based on internal similarity of patterns as measured by texture, chaos or other data or geometric attributes.

6. The method of claim 4, wherein the selected subset of the eigenvectors is determined by summing eigenvalues ordered from largest to smallest until the sum of the largest N eigenvalues divided by the sum of all eigenvalues exceeds a preselected value of R where 0<R<1, then selecting the N eigenvectors associated with the N largest eigenvalues.

7. The method of claim 3, wherein the mean and the covariance matrix for the selected window size and shape are computed using complementary windows, where a complementary window corresponding to each location in the window selected at (a) represents a set of data values that appear at that location as the window is moved through an original data volume.

8. The method of claim 2, wherein statistical analysis is performed using (i) and computing the covariance matrix is performed by computing a series of cross-correlation operations on progressively smaller regions in each window.

9. The method of claim 2, wherein the statistical analysis technique is (iv), comprising using a non-linear transformation to represent the data window vectors with a basis set, wherein the non-linear transformation involves a parameter that defines a notion of scale.

10. The method of claim 9, wherein there are N data window locations and hence N data window vectors, each with M components, i.e. M data voxels at each data window location; and wherein the diffusion mapping technique comprises:
collecting the N data window vectors $\{x_n\}_{n=1}^{N}$, into a data array $A_{m,n}$, where m=1, . . . , M and n=1, . . . , N;
computing an M×M similarity matrix L, wherein $L_{i,j}$ is a measure of the difference between $a_i$ and $a_j$, where $a_i$ and $a_j$ are row vectors of length N from the data array $A_{m,n}$ and M ⋺ i,j; and wherein $L_{i,j}$ involves a user-selected scale parameter;
forming a diagonal matrix D from the similarity matrix, where $D_{i,i}=\Sigma_{j=1}^{N}L_{i,j}$;
computing a diffusion matrix by normalizing the similarity matrix: $M=D^{-1}L$;
computing a symmetric diffusion matrix $M_{sym}=D^{1/2}MD^{-1/2}$; and
using the symmetric diffusion matrix for pattern analysis or anomaly detection of the original data volume, and associating one or more geologic features with one or more patterns or anomalies.

11. The method of claim 10, wherein $$L_{I,j}=\exp(-\|a_i-a_j\|^2/\epsilon)$$

where $\epsilon$ is the user-selected scale parameter, and $\| \ldots \|$ denotes a selected norm.

12. The method of claim 11, further comprising performing the statistical analysis for at least one additional choice of $\epsilon$.

13. The method of claim 10, wherein using the statistical analysis to identify outliers or anomalies in the data comprises computing eigenvectors and eigenvalues of the symmetric diffusion matrix, and using them in pattern analysis.

14. The method of claim 10, wherein using the statistical analysis to identify outliers or anomalies in the data comprises:
using the selected data window shape and size, collecting all possible samples from the original data volume;
projecting all data samples on to the symmetric diffusion matrix's inverse, thereby creating a scale dependent anomaly attribute volume; and
identifying outliers or anomalies in the scale dependent anomaly attribute volume.

15. The method of claim 9, wherein M<<N.

16. The method of claim 1, wherein the data window is N-dimensional, where N is an integer such that 1≦N≦M, where M is the data set's dimensionality.

17. The method of claim 1, further comprising using the predicted geologic features of the subsurface region to infer petroleum potential or lack thereof.

18. The method of claim 1, wherein the plurality of locations is determined by a sampling strategy selected from a group consisting of potentially random, exhaustive, and tiled.

19. The method of claim 1, wherein:
the data window may move to overlapping positions;
each data voxel in an original data volume is included in at least one window; and
a distribution for data values is computed from the statistical analysis and is used to identify the outliers or anomalies in the data.

20. The method of claim 19, wherein identification of outliers or anomalies in the data comprises (i) computing a probability of occurrence, or equivalent metric, of each data window in the data value distribution; and (ii) identifying low probability data regions as possible outliers or anomalies.

21. A method for identifying geologic features from a 2D or 3D discretized set of geophysical data or data attribute ("original data volume") representing a subsurface region, comprising:
(a) selecting a data window shape and size;
(b) moving the window to a plurality of overlapping or non-overlapping positions in the original data volume such that each data voxel is included in at least one window, and forming for each window a data window vector I whose components consist of voxel values from within that window;
(c) computing the covariance matrix of all the data window vectors;
(d) computing eigenvectors of the covariance matrix;
(e) projecting the original data volume on a selected subset of the eigenvectors to generate a partial projected data volume; and
(f) identifying outliers or anomalies in the partial projected data volume, and using them to predict geologic features of the subsurface region.

22. The method of claim 21, wherein the selected subset of the eigenvectors to generate a partial projected data volume is determined by eliminating eigenvectors based on their associated eigenvalues.

23. The method of claim 21, wherein the selected subset of the eigenvectors is either chosen interactively by a user or based on automatically identified noise or geometric characteristics.

24. The method of claim 21, wherein the selected subset of the eigenvectors is determined by devising a criterion for determining obvious anomalies in the original data volume, selecting one or more obvious anomalies using the criterion, and identifying one or more eigenvectors whose associated data component (projection of the original data volume on the eigenvector) contributes to the selected obvious anomalies or accounts for more than a pre-set amount of background signal, then selecting some or all of the remaining eigenvectors; wherein step (f) enables discovery of anomalies that are more subtle than said obvious anomalies used to determine the selected subset of the eigenvectors.

25. The method of claim 24, further comprising after step (e) repeating steps (a)-(e) using the partial projected data volume instead of the original data volume, generating an updated partial projected data volume which is then used in step (f).

26. The method of claim 21, wherein computing the covariance matrix is performed by computing a series of cross-correlation operations on progressively smaller regions of the data volume.

27. A method for identifying geologic features in a 2D or 3D discretized set of geophysical data or data attribute ("original data volume") representing a subsurface region, comprising:
   (a) selecting a data window shape and size;
   (b) moving the window to a plurality of overlapping or non-overlapping positions in the original data volume such that each data voxel is included in at least one window, and forming for each window a data window vector I whose components consist of voxel values from within that window;
   (c) computing the covariance matrix of all the data window vectors;
   (d) computing eigenvalues and eigenvectors of the covariance matrix;
   (e) selecting a method for computing degree of anomaly of a voxel, and using it to determine a partial data volume consisting of voxels computed to be more anomalous than a pre-determined threshold; and
   (f) identifying one or more anomalous features in the partial data volume, and using them to predict geologic features of the subsurface region.

28. The method of claim 27, wherein the degree of anomaly R' of a voxel denoted by x, y, z indices i, j, k is computed from $$R_{i,j,k}' = (I_{i,j,k} - \bar{I})^T \hat{W}^{-1} (I_{i,j,k} - \bar{I})$$

where $I_{i,j,k}$ is a component of a data window vector from (b) that includes voxel i, j, k;

$$\bar{I} = \frac{1}{N} \sum_{i,j,k} \vec{I}_{i,j,k}, \quad W = \frac{1}{N} \sum_{i,j,k} \left( \vec{I}_{i,j,k} - \vec{\bar{I}} \right) \left( \vec{I}_{i,j,k} - \vec{\bar{I}} \right)^T;$$

where the discretized original data volume consists of $N_x \times N_y \times N_z$ voxels, the selected window shape and size is $n_x \times n_y \times n_z$ voxels, and $N = (N_x - n_x) \times (N_y - n_y) \times (N_z - n_z)$.

29. The method of claim 27, wherein the degree of anomaly is determined by projecting the original data volume on a selected subset of the eigenvectors to generate a partial projected data volume, said subset of eigenvectors being selected based on their corresponding eigenvalues, and determining a residual data volume, being the portion of the original data volume not captured in the projected data volume, said residual data volume being the partial data volume used to predict physical features of the subsurface region in (f).

30. The method of claim 27, wherein the degree of anomaly is determined by projecting the original data volume on a selected subset of the eigenvectors to generate the partial data volume for use in (f).

31. A method for producing hydrocarbons from a subsurface region, comprising:
   (a) obtaining results of a geophysical survey of the subsurface region;
   (b) obtaining a prediction of petroleum potential of the subsurface region based at least in part on physical features of the region identified using a method as described in claim 1, which is incorporated herein by reference;
   (c) in response to a positive prediction of petroleum potential, drilling a well into the subsurface region and producing hydrocarbons.

* * * * *